Sept. 15, 1925.
1,553,360
C. A. BODDIE
FEEDER REGULATOR SYSTEM
Filed Aug. 26, 1919
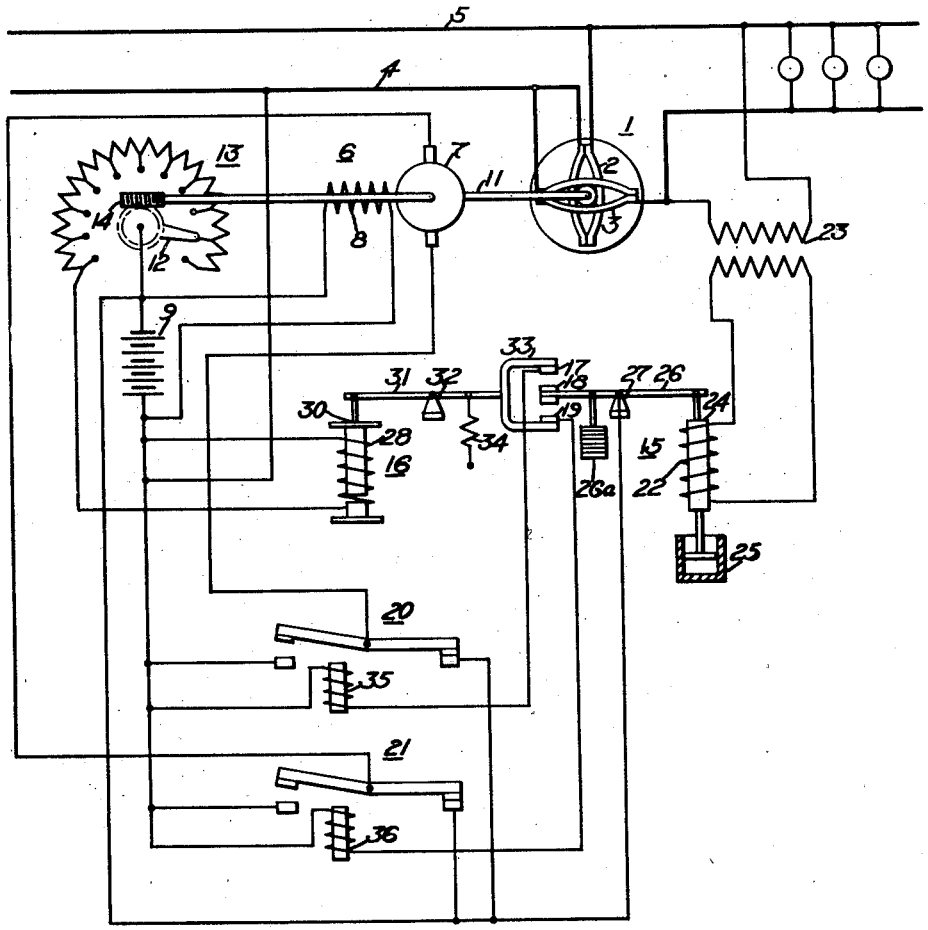
WITNESSES:
J. B. Merrill
W. B. Wells
INVENTOR
Clarence A. Boddie
BY
ATTORNEY Patented Sept. 15, 1925.

1,553,360

UNITED STATES PATENT OFFICE.

CLARENCE A. BODDIE, OF PITTSBURGH, PENNSYLVANIA, ASSIGNOR TO WESTINGHOUSE ELECTRIC & MANUFACTURING COMPANY, A CORPORATION OF PENNSYLVANIA.

FEEDER-REGULATOR SYSTEM.

Application filed August 26, 1919. Serial No. 319,911.

*To all whom it may concern:*

Be it known that I, CLARENCE A. BODDIE, a citizen of the United States, and a resident of Pittsburgh, in the county of Allegheny and State of Pennsylvania, have invented a new and useful Improvement in Feeder-Regulator Systems, of which the following is a specification.

My invention relates to voltage-regulator systems and particularly to induction regulators for maintaining substantially-constant voltage on feeder circuits.

One object of my invention is to provide a feeder circuit with an induction regulator that shall be operated to maintain substantially-constant voltage on a feeder circuit and that shall be provided with auxiliary means operated in accordance with the operation of the regulator for preventing it from effecting any hunting action.

In controlling the voltage on a feeder circuit by means of an induction regulator, it is customary to connect the primary and the secondary windings across and in series respectively with the feeder circuit to be regulated and to operate the regulator by a motor which is governed by a contact-making voltmeter in accordance with the voltage obtaining on the regulated circuit. The regulation of a feeder circuit by such method is objectionable in one respect inasmuch as the regulator effects a constant hunting action which prevents a steady regulation of the feeder circuit and also limits the speed of the regulator.

In regulating a feeder circuit by an induction regulator which is controlled in accordance with my invention, means is provided for preventing overtravel by the moving parts of the regulator and the controlling apparatus associated with it so as to avoid the consequent hunting action which results from such overtravel.

In practicing my invention, the primary winding of an induction regulator is connected across the feeder circuit to be regulated and the secondary winding of the regulator is connected in series with such circuit. A motor is provided for effecting relative movement between said windings and for operating a rheostat to prevent hunting action by the regulator. The motor is operated by two switches in a clockwise and in a counter-clockwise direction according to the voltage obtaining upon the regulated circuit. The two switches are controlled by a main control element embodying a main and an auxiliary electromagnet which jointly control a set of main contact members. The main electromagnet is energized directly in accordance with the voltage obtaining on the feeder circuit for selectively energizing the switches to determine the operation of the regulator motor and, the auxiliary electromagnet is controlled by the motor-operated rheostat to modify the operation produced by the main magnet in a manner to prevent hunting action.

The single figure in the accompanying drawing is a diagrammatic view of a regulator system embodying my invention.

Referring to the drawing, an induction regulator 1, comprising a primary winding 2 and a secondary winding 3, is connected to a feeder circuit comprising conductors 4 and 5. The primary winding 2 is connected across the feeder circuit and the secondary winding 3 is connected in series with the circuit. The primary winding 2 of the induction regulator is operated by a motor 6 to boost or to buck the voltage upon the feeder circuit in a manner to maintain the voltage on the feeder circuit substantially constant. The motor 6 comprises an armature 7 and a field winding 8. The field winding 8 is directly connected across a battery 9. The motor 6 is mechanically connected to the primary winding 2 of the regulator in any suitable manner such as by means of a shaft 11 and, is connected to the arm 12 of a rheostat 13, by means of a worm gearing 14, for operating the rheostat in accordance with the operation of the regulator.

A main control element, comprising a main magnet 15, an auxiliary magnet 16 and main contact members 17, 18 and 19, is provided for operating two switches 20 and 21 in accordance with the voltage obtaining upon the feeder circuit. The switches 20 and 21 connect the armature across the battery 9 for rotating the motor 6 in a clockwise and in a counter-clockwise direction.

The main magnet 15 comprises a winding 22, which is connected across the feeder circuit by means of a potential transformer 23, and a core armature 24 which is operated by the winding 22. The core armature 24 is provided with a dash pot 25 for adjusting its speed of operation and is pivotally connected to a contact arm 26. The contact arm 26 is fulcrumed at 27 and carries the main contact member 18, which co-operates with the contact members 17 and 19, and a weight 26ª which counterbalances the weight of the core armature 24.

The auxiliary electromagnet 16 comprises a winding 28 which is connected in series with the rheostat 13 across the battery or other suitable source of energy 9. The winding 28 operates a core armature 30 which is pivotally connected to a contact arm 31. The contact arm 31 is fulcrumed at 32 and is provided with a bifurcated end portion 33 that carries the main contact members 17 and 19. A spring 34 is connected to the contact arm 31 and serves to counterbalance a portion of the weight of the core armature 30.

The switch 20 is provided with an energizing winding 35 which is connected across the battery 9 upon engagement between the contact members 17 and 18 and the switch 21 is provided with an energizing winding 36 which is connected across the battery 1 upon engagement between the contact members 18 and 19.

Upon engagement between the contact members 17 and 18, the switch 20 is operated to rotate the motor 6 in a counter-clockwise direction and thus increase or boost the voltage of the feeder circuit. Upon engagement between the contact members 18 and 19, the switch 21 is operated to effect rotation of the motor in a clockwise direction and thus operate the regulator to lower or buck the feeder-circuit voltage.

Assuming a voltage below normal value to obtain upon the feeder conductors 4 and 5, then the energization of the main magnet 15 is decreased to effect engagement between the contact members 17 and 18. Upon engagement between the contact members 17 and 18, a circuit is completed which extends from one terminal of the battery 9 through the contact arm 26, contact members 18 and 17 and the winding 35 of the switch 20 to the other terminal of the battery 9. Thereupon, the switch 20 is operated to complete a circuit from the battery 9 through the armature 7 of the motor 6. The motor 6 is rotated in a counter-clockwise direction and the regulator 1 is operated to increase or boost the voltage obtaining upon the feeder circuit.

If the main control element were controlled solely by the feeder circuit, then the main magnet 15 would not be operated to separate the contact members 17 and 18 to prevent further operation of the motor 6 to increase the feeder circuit voltage until normal voltage conditions obtained upon the feeder circuit. Consequently, the motor 6 and the various moving parts of the system would overtravel and overcompensate the feeder circuit and thus produce the so-called hunting action.

In order to prevent such hunting action, the rheostat 13 is operated by the motor 6 in accordance with the operation of the regulator 1 for varying the energization of the auxiliary magnet 16. Thus, the auxiliary magnet 16 is operated in a manner to oppose the initial operation of the contact members by the main magnet 15 and to separate the contact members at a time just previous to the obtaining of normal voltage conditions upon the feeder circuit. In the case just considered, the energization of the auxiliary magnet 16 is increased by the counter-clockwise rotation of the motor 6 to effect disengagement between the contact members 17 and 18 just previous to the raising of the feeder-circuit voltage to normal value.

In case a voltage above normal value obtains upon the conductors 4 and 5, then the energization of the main magnet 15 is increased to effect engagement between the contact members 18 and 19. Thereupon, the winding 36 of the switch 21 is energized from the battery 9. The switch 21 connects the armature 7 across the battery 9 and effects clockwise rotation of the motor 6 to operate the regulator 1 to decrease or buck the voltage obtaining upon the feeder circuit. Simultaneously with the operation of the regulator 1, the rheostat 13 is operated to increase the resistance included in circuit with the auxiliary magnet 16. Thereupon, the energization of the magnet 16 is reduced to operate the contact arm 31 so as to effect disengagement between the contact members 18 and 19 just prior to the reducing of the feeder-circuit voltage to normal value.

Thus, it is apparent the motor-operated induction regulator is automatically controlled by a main control element in accordance with the voltage obtaining upon a feeder circuit to maintain substantially-constant voltage on such circuit. Moreover, the main control element is subjected to a reactionary force which varies in accordance with the operation of the induction regulator to prevent hunting action by the regulator.

Modifications in the system and arrangement and location of parts may be made within the spirit and scope of my invention, and such modifications are intended to be covered by the appended claims.

I claim as my invention:

1. In a voltage-regulator system, the combination comprising a feeder circuit, an induction regulator connected to the feeder circuit, a main control element for governing said regulator to maintain substantially-constant feeder circuit voltage, and means comprising a variable resistor operated in accordance with the operation of the regulator for reacting on the main control element to prevent hunting action.

2. In a voltage-regulator system, the combination comprising a feeder circuit, an inductive device having two windings movable relative to each other and connected to the feeder circuit for governing the feeder-circuit voltage, means comprising a motor for controlling one of said windings to maintain constant feeder-circuit voltage, and rheostatic means controlled by said motor for preventing hunting action.

3. In a voltage-regulator system, the combination with a feeder circuit, an induction regulator connected to the feeder circuit, and a motor for operating said regulator to govern the feeder-circuit voltage, of a main electro-magnet operated in accordance with the feeder-circuit voltage, contact members operated by said main magnet, means controlled by said contact members for operating said motor in a clockwise and in a counter-clockwise direction, a rheostat operated by said motor, and an auxiliary magnet controlled by said rheostat for operating said contact members to prevent hunting action.

4. In a voltage-regulator system, the combination comprising a feeder circuit, an induction regulator connected to the feeder circuit, a motor for operating said regulator, automatic means for controlling the operation of said motor to maintain substantially-constant feeder-circuit voltage, and resistor means controlled by said motor for reacting on said automatic means to prevent hunting action.

5. In a voltage-regulator system, the combination comprising a feeder-circuit, an induction regulator having two windings respectively connected in series and across the feeder circuit, a rheostat, a motor for effecting relative movement between said windings to control the feeder-circuit voltage, and for operating said rheostat, and means controlled by the feeder circuit for operating the motor to maintain substantially-constant feeder-circuit voltage and controlled by the operation of said rheostat to prevent hunting action.

6. In a voltage-regulator system, the combination comprising an induction regulator, a motor for controlling the operation of the regulator, a rheostat controlled by said motor, means for controlling the operation of said motor and means influenced by said rheostat to prevent hunting action.

7. In a voltage-regulator system, the combination comprising an induction regulator connected to a feeder circuit, a motor operable in a clockwise and in a counter-clockwise direction for operating said regulator, a rheostat operated by said motor, and a main control element having a main magnet and an auxiliary magnet for governing the operation of said motor, said main magnet being controlled by the feeder circuit and the auxiliary magnet being energized in accordance with the operation of said rheostat to prevent hunting action.

In testimony whereof, I have hereunto subscribed my name this 12th day of Aug. 1919.

CLARENCE A. BODDIE.